Dec. 25, 1962
A. K. PETERSON
3,070,230
APPARATUS FOR SEPARATING MATERIALS
Filed Dec. 12, 1958
3 Sheets-Sheet 1
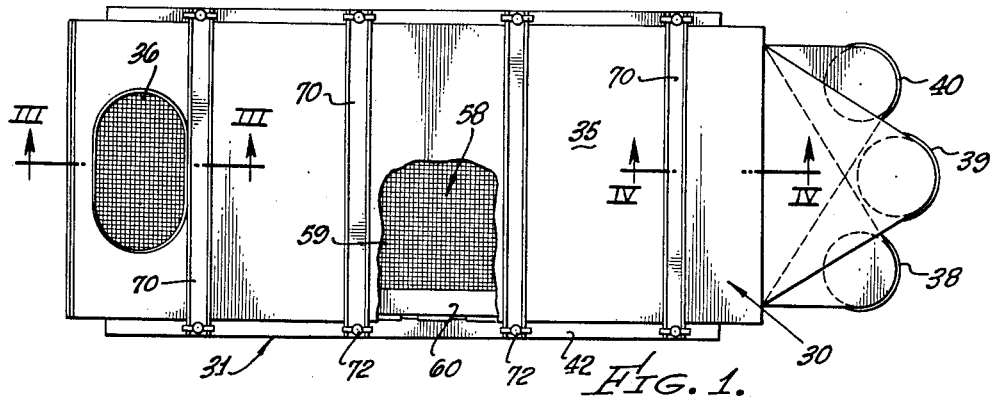
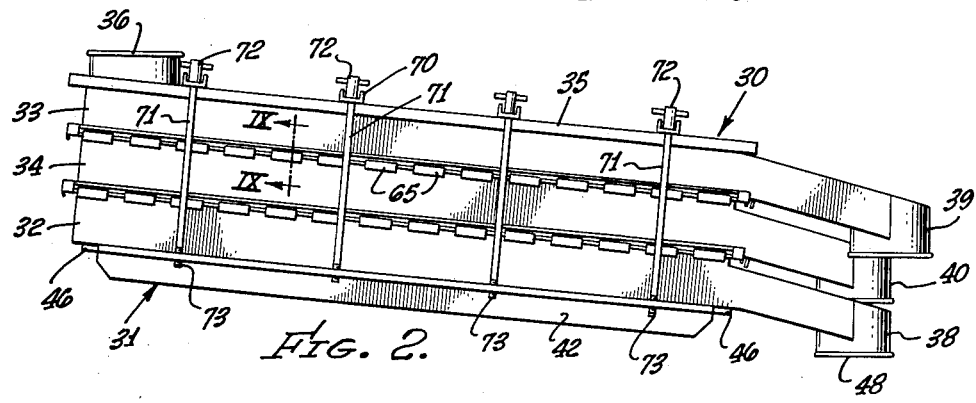
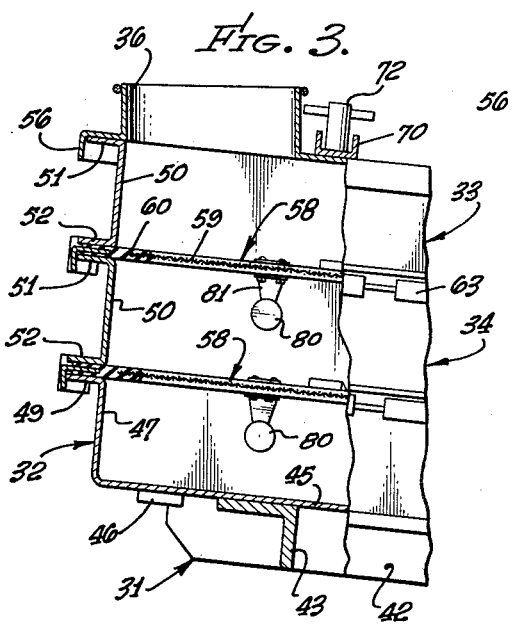
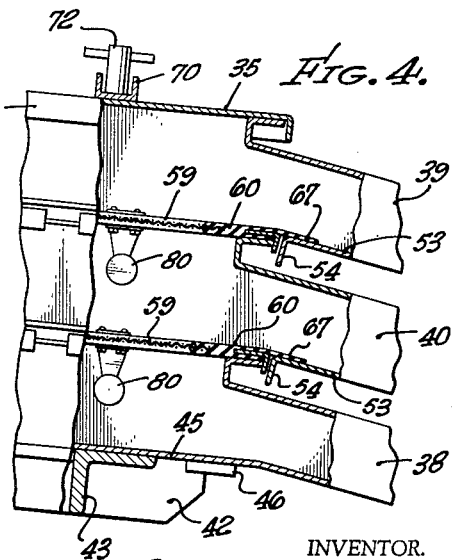
INVENTOR.
ALBIN K. PETERSON
BY
Miketta and Glenny
ATTORNEYS.

Dec. 25, 1962  A. K. PETERSON  3,070,230
APPARATUS FOR SEPARATING MATERIALS
Filed Dec. 12, 1958  3 Sheets-Sheet 2
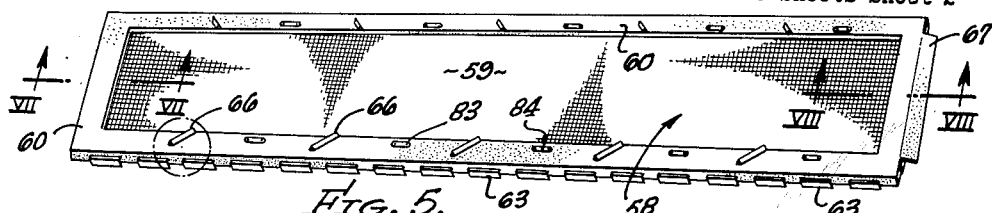
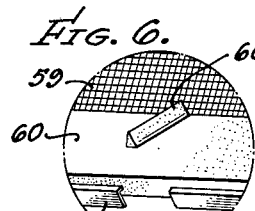
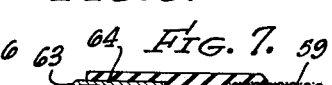
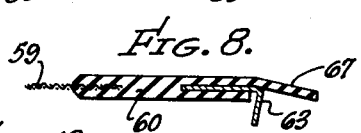
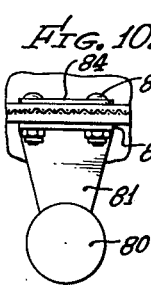
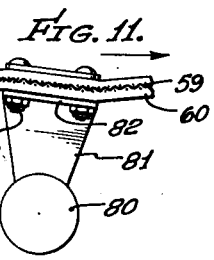
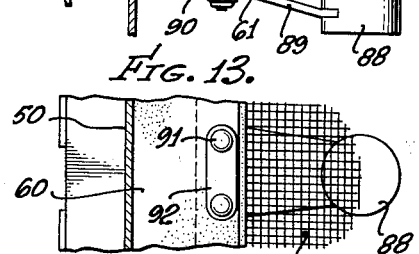
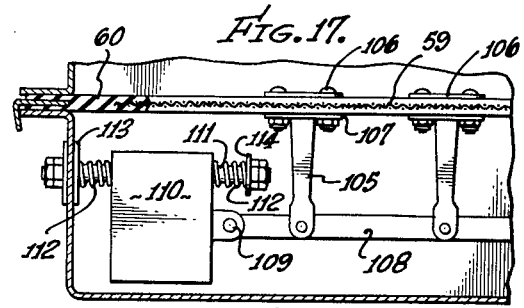
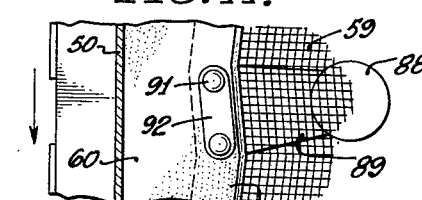
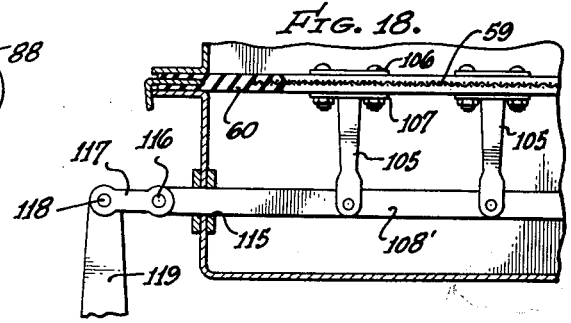
INVENTOR.
ALBIN K. PETERSON
BY Miketta and Glenny
ATTORNEYS.

Dec. 25, 1962  A. K. PETERSON  3,070,230
APPARATUS FOR SEPARATING MATERIALS
Filed Dec. 12, 1958  3 Sheets-Sheet 3
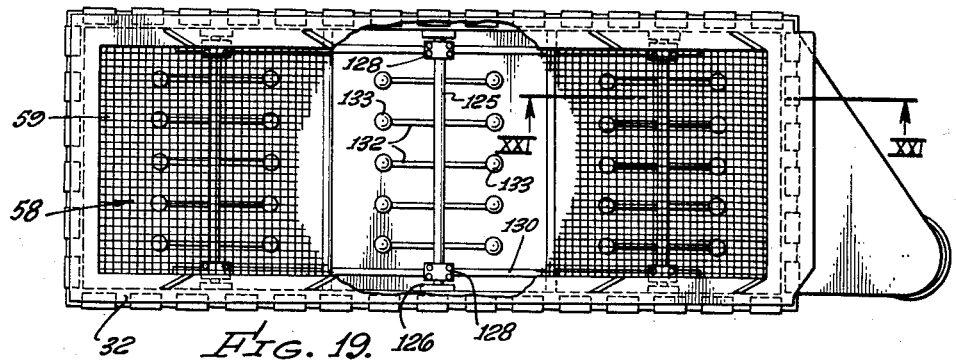
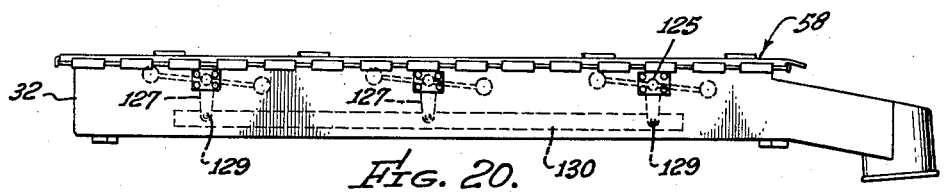
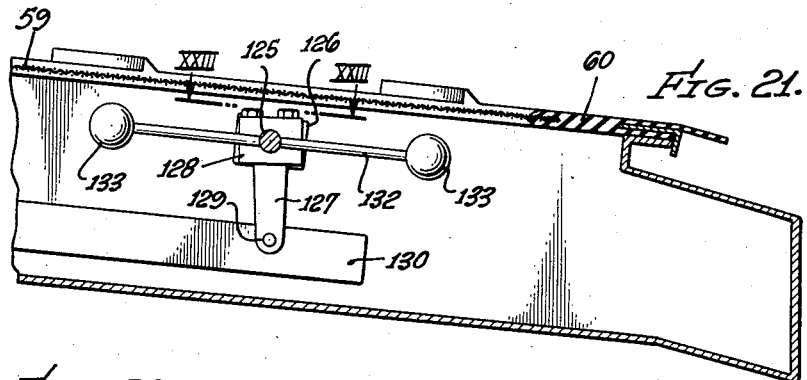
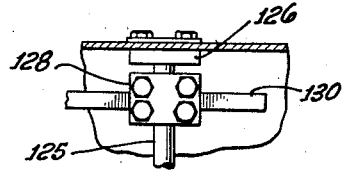
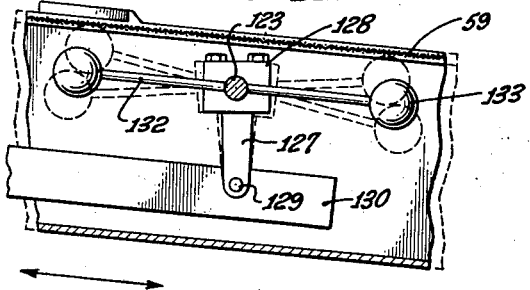
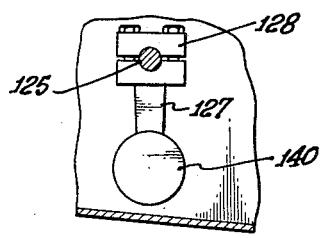
INVENTOR.
ALBIN K. PETERSON
BY
Miketta and Glenny
ATTORNEYS.

United States Patent Office 3,070,230
Patented Dec. 25, 1962

3,070,230
APPARATUS FOR SEPARATING MATERIALS
Albin K. Peterson, Torrance, Calif., assignor to
Lottie J. Peterson, Torrance, Calif.
Filed Dec. 12, 1958, Ser. No. 779,952
20 Claims. (Cl. 209—310)

This invention relates to an apparatus for separating material particles of flowable nature and more particularly to an apparatus including a shaking box assembly wherein means are provided for imparting secondary vibratory impulses to a screen fabric in response to primary impulses imparted to said screen fabric. The invention is also particularly directed to a novel assembly of such a shaking box assembly for a separator apparatus.

A receptacle means or shaking box assembly of rectangular shape embodying the present invention may be utilized with separator apparatuses of different types of construction. An example of a separator apparatus may be that shown and described in my Letters Patent No. 2,874,841. In said patent a separator apparatus is provided with a shaking box assembly swingably suspended from a frame means. A motor means is carried by the box assembly and may be suspended therebeneath. An eccentric connection may be provided between the motor means and the box assembly so that upon energization of the motor means a primary vibratory impulse will be imparted to the box assembly in a longitudinal direction with respect to the box assembly.

Machines for separating flowable material particles are subject to problems such as clogging or blinding of the mesh of the screen fabric used in the shaking box assembly, efficient separation of material at a rate of material flow which will make the operation economical, and frequency of repair and maintenance of the shaking box assembly. In prior proposed separator machines in which a shaking box assembly was inclined at an angle and a vibratory reciprocatory impulse was imparted thereto in a longitudinal direction, the volume of material which could be efficiently and effectively separated was relatively limited because of the selected paths of movement of the particles of material on the screen mesh. In the separation of material having a fine particle size, the screen mesh often became clogged or blinded thereby, thus severely limiting the efficiency of the screen. Various types of machines have been proposed in order to improve the efficiency of such separating machines, but such improvements have not resulted in a completely satisfactory machine.

The present invention contemplates a novel shaking box assembly wherein secondary vibratory impulses may be imparted to a screen means in relation to the primary impulse imparted to the box assembly. Generally speaking, the novel shaking box assembly comprises a rigid frame means upon which may be positioned and supported a plurality of individually separable box sections with screen means held in stretched relation between adjacent box sections, the screen means, box sections, rigid frame means, and a cover member being clamped together in assembled relation. In spaced relation beneath each screen means may be inertia means supported by means whereby the reaction of the inertia means to the primary vibratory impulses may impart to the screen means a secondary vibratory impulse. This secondary impulse is provided without undue wear on or maintenance of the screen means.

The primary object of this invention therefore is to provide a novel shaking box and screen assembly for a separator apparatus.

An object of this invention is to provide a shaking box assembly which may be retained in assembly in novel manner and disassembled in convenient facile manner.

Another object of this invention is to disclose and provide a shaking box assembly wherein screen means are provided therefor, said screen means being of novel form and construction.

Still another object of this invention is to disclose and provide a shaking box assembly provided with a screen means and including means for imparting secondary vibratory impulses thereto in accordance with primary vibratory impulses imparted to the screen means by a motor means carried by the separator apparatus.

Still another object of this invention is to disclose and provide a screen means for a shaking box assembly which includes a resilient peripheral border member, said border member being provided with means for directing a portion of the path of flow of material being separated thereon.

A more specific object of this invention is to disclose and provide a screen means for a separating apparatus wherein the screen means includes a resilient border member and wherein means are connected with said resilient border member for imparting secondary vibratory impulses to the screen means.

A more specific object of the invention is to disclose and provide a screen means for a separator apparatus wherein said screen means includes a resilient border member and wherein a plurality of inertia elements are connected with said resilient border member.

Still another object of the invention is to disclose and provide such a screen means with a resilient border member wherein a plurality of depending arms are connected to the resilient border member and a bar interconnects the bottom ends of said arms and wherein means may be connected to said bar for imparting reciprocal motion thereto in accordance with primary vibratory impulses imparted to the screen means.

An important object of this invention is to provide a shaking box assembly having a screen means to which secondary vibratory impulses may be imparted in response to a primary vibratory impulse imparted to the box assembly by a motor means.

A more specific object is to provide a shaking box assembly as above wherein means for imparting the secondary vibratory impulses may include a plurality of transversely arranged elements supported from the shaking box assembly below a screen means for tapping said screen means.

These and many other objects of this invention will be readily apparent from the following description of the drawings in which several exemplary embodiments of the invention are shown.

In the drawings:

FIG. 1 is a top plan view, with a portion of a cover and top box section broken away, of a shaking box assembly embodying this invention.

FIG. 2 is a side elevational view of the shaking box assembly shown in FIG. 1.

FIG. 3 is a vertical sectional view taken in the plane indicated by line III—III of FIG. 1.

FIG. 4 is a vertical sectional view taken in the plane indicated by line IV—IV of FIG. 1.

FIG. 5 is a perspective view of a screen means used with the shaking box assembly shown in FIG. 1.

FIG. 6 is an enlarged fragmentary perspective view of a portion of the screen means of FIG. 5.

FIG. 7 is a fragmentary sectional view taken in the plane indicated by line VII—VII of FIG. 5.

FIG. 8 is a fragmentary sectional view taken in the plane indicated by line VIII—VIII of FIG. 5.

FIG. 9 is an enlarged fragmentary sectional view of the screen means with an inertia element attached thereto, taken in the plane indicated by line IX—IX of FIG. 2.

FIG. 10 is a fragmentary view taken from the right of FIG. 9.

FIG. 11 is a view similar to FIG. 10 showing the action of an inertia weight.

FIG. 12 is an enlarged fragmentary sectional view of a different method of mounting an inertia weight.

FIG. 13 and FIG. 14 are top fragmentary plan views of the section shown in FIG. 12.

FIG. 15 is a fragmentary enlarged sectional view of a still different modification of the inertia weight of this invention.

FIG. 16 is a fragmentary sectional view taken from the right of FIG. 15.

FIG. 17 is an enlarged fragmentary sectional view of a still different embodiment of this invention.

FIG. 18 is a fragmentary sectional view showing another embodiment of this invention.

FIG. 19 is a top plan view of a screen means and a shaking box section embodying still another embodiment of the invention.

FIG. 20 is a side view of FIG. 19.

FIG. 21 is an enlarged fragmentary sectional view taken in the vertical plane indicated by line XXI—XXI of FIG. 19.

FIG. 22 is a fragmentary sectional view taken in the same plane as FIG. 21 and showing action of the secondary impulse imparting means shown in FIG. 19.

FIG. 23 is an enlarged fragmentary sectional view taken in the plane indicated by line XXIII—XXIII of FIG. 21.

FIG. 24 is a fragmentary view of a different modification of the inertia weight shown in FIG. 19.

Referring to FIGS. 1–4 inclusive, a receptacle means or shaking box assembly generally indicated at 30 may be of a construction which may be utilized on different types of separating apparatuses which may provide a frame means for supporting the shaking box assembly in an inclined position and in such a manner that longitudinal reciprocatory primary vibrating impulses may be imparted thereto by suitable means, such as a motor means. The frame support means for the shaking box assembly 30 is not shown because it is not part of the invention and examples of such support means and motor means to impart primary vibrating impulses are shown and described in my copending application Serial No. 399,475 filed December 21, 1953 now Letters Patent 2,874,841.

Generally speaking, the receptacle means 30 comprises a rigid frame means 31 and similarly rectangularly shaped bottom box section 32, a top box section 33, and an intermediate box section 34. A rectangular cover member 35 may include an inlet duct 36 at the head end thereof and discharge ducts 38, 39 and 40 may be associated with the respective box sections 32, 33 and 34.

The rigid frame means 31 may include longitudinally extending side angle-section members 42 interconnected in parallel relation by a plurality of transversely extending angle-section members 43. The top surfaces of the frame members 42 and 43 lie in the same plane so as to provide a support for a bottom wall 45 of bottom box section 32. The bottom box section 32 may be positioned and located on rigid frame means 31 by a plurality of corner depending positioning elements 46 secured to bottom wall 45 and adapted to engage with ends of side members 42.

Bottom box section 32 includes a peripheral wall 47 extending along two sides and the head and tail end of the box section. At the tail end of box section 32 discharge duct means 38 may include bottom and top walls of generally triangular shape interconnected by side walls and providing an outlet 48 adjacent one corner of the receptacle means. The bottom wall of the discharge duct 38 may be integral with the bottom wall 45, if desired. The peripheral wall 47 of the bottom box section 32 terminates in an outwardly turned continuous peripheral flange 49.

Box sections 34 and 33 may each include a rigid hollow peripheral frame formed of outwardly facing channel section, each box section 34, 33 providing a peripheral wall 50 with top and bottom flanges 51 and 52. Discharge ducts 40 and 39 are formed with box sections 34 and 33 respectively in a manner similar to that described for discharge duct 38. Since box sections 34 and 33 are not provided with bottom walls, bottom walls 53 of said discharge ducts may each be provided with a downturned lip 54 adapted to be positioned proximate to the top flange 49 of the bottom box section or the top flange 51 of the intermediate box section 34. Box sections 32, 34, 33 may be readily stacked one upon the other by superimposing in alignment the flanges 52 on respective flanges 49 and 51.

Cover member 35 may be made of any suitable sheet-like metal stock and may be provided with a depending continuous peripheral flange 56, said flange 56 extending over and below top flange 51 of the top box section 33.

Screen means 58 of rectangular shape, best shown in FIG. 5, may include a screen fabric 59 of any suitable selected material and mesh size and a resilient continuous peripheral border member 60 bonded thereto. The border member 60 may be made of any suitable rubber or synthetic rubber composition material of selected thickness and of selected Shore hardness so as to provide predetermined elasticity of the border member to uniformly tension the screen fabric 59 when screen means 58 is installed on a box section. The resilient border member 60 may include an inner peripheral portion 61 in which the edge margin of the screen fabric 59 may be suitably bonded as by vulcanizing. Outer peripheral border portion 62 may be provided with a plurality of peripherally spaced retaining clips 63, each clip 63 having a clip portion 64 embedded in and bonded to the outer border portion 62 and a depending clip portion 65 adapted to engage with the edge of a flange 51 or 49 on the associated box section. Each screen means 58 may be assembed with its associated box section by first engaging clips 63 with flanges at two contiguous edges of the box section and then by tensioning the screen fabric and the resilient material of the border member positioning the other clips 63 so that they may be snapped over the flanges at the opposite two contiguous edges of the box section. The resilient border member serves to uniformly tension the screen fabric both longitudinally and laterally and to maintain such tension.

On the top surface of longitudinal or side portions of the resilient border member 60 may be provided a plurality of spaced angularly disposed material-deflecting ribs 66, said ribs 66 being formed integral with the inner peripheral portions 61. It will be noted from FIG. 5 that ribs 66 serve to direct material being separated which might collect on the portion 61 inwardly onto the screen fabric 59.

At the tail end of each screen means 58 the peripheral resilient border member 60 may be provided with an integral extension lip 67 which overlies clips 65 and which may extend upon the bottom wall of the discharge duct associated therewith. The lip 67 spans the gap between the edge of the box section flange and the downturned lip 54 on the bottom wall of the discharge duct. It will be apparent that extension lip 67 provides a relatively uninterrupted surface for flow of material being separated from the screen fabric into the discharge duct.

Clamping means for retaining the box sections, rigid frame means 31, cover member, and screen means in stacked assembled relation may comprise a plurality of transversely extending U-section channel members 70 secured to the top surface of the cover member 35 in any suitable manner as by welding. Each member 70 extends beyond the side edge of cover member 35 and such extension may be provided with a port to receive therethrough a clamping bolt or bar 71. Bolt 71 may have an enlarged headed end 72 fixed on the top end thereof and providing bearing upon the extension of the channel member 70. Each bolt 71 extends downwardly and terminates in a threaded end 73 which may be threadedly engaged with a threaded port provided in the longitudinal side frame member 42. Thus when box sections 32, 33, 34 with screen means 58 therebetween are positioned and located on the rigid frame means 30, cover member 35 placed on top of the box sections, and bolts 71 threaded into the threaded ports in the side member 42 and drawn tight, all of the parts will be held in tight assembled relation.

In assembly of each box section, it will be noted that the outer peripheral portion 62 of the resilient border member 60 is seated on flange 49 or 51 and the inner peripheral portion 61 extends inwardly of the peripheral walls of the box sections. When the clamping means are drawn tight, the outer peripheral portion is compressed between the flanges 51, 52 and serves to seal the joint between box sections. The clamping means also serves to positively prevent any displacement of clip means 63 which might cause slack in the tension of the screen means.

The individual separable box sections 32, 33, 34 and cover member 35 may be readily disassembled by loosening and withdrawing bolts 71 from threaded engagement with the rigid frame means 31. Box sections such as 33, 34 may be added or taken away from the assembly if desired. Screen means 58 may be readily replaced if worn or if different size mesh is required. Replacement of screen means may be accomplished with a minimum of loss of time of equipment or of man power.

One of the important aspects of the present invention is to provide means to impart a secondary impulse to the screen fabric 59 in relation to or in accordance with the primary impulse imparted to the shaking box assembly by a motor means with an eccentric connection thereto such as shown in my Letters Patent 2,874,841. Such secondary impulse imparted to the screen fabric 59 is not only for the purpose of preventing the screen fabric from clogging or becoming blinded by particles of material which do not pass completely through the mesh, but also to facilitate a more efficient effective flow of material on the screen fabric so that a greater volume of material may be separated in a given time period. The invention contemplates several different ways of producing such secondary impulses.

In FIGS. 9, 10 and 11 a plurality of spaced inertia weights 80 may be suspended below each longitudinally extending inner resilient border portion 61, each weight being carried at the lower end of inertia arm 81. A flange 82 at the top of arm 81 may be seated against bottom surface of portion 61 and may be held thereagainst by a pair of bolts 83 interconnected by a bearing strap 84 on top of portion 61. The connection of the inertia arm 81 to the inner portion 61 in spaced relation to peripheral walls of the associated box section provides an intermediate portion 85 of the resilient border member which is effective to uniformly tension and stretch the screen fabric 59 when the inertia weights 80 are suspended from the border member.

In this example, when a vibratory impulse is imparted to the screen means 58 in a longitudinal direction, inertia of weights 80 will transmit a vertical component of a reactive force through arm 81, flange 82, and strap 84 to the inner portion 61 of the resilient border member. When weights 80 are properly selected for the density of the material to be separated, and for the selected amplitude of the primary impulse, each inertia weight 80 will remain relatively immovable or stationary at its initial position. The upper end of the arm 81 will, in relation to the lower end thereof, swing about the inertia weight 80 and produce vertical deflection in the adjacent portion of the screen fabric. The effect of a plurality of such inertia weights 80 at each side of screen means 58 will be that of an undulating wave motion in the screen fabric which appears as if the wave is travelling in a longitudinal direction towards the tail end of the box assembly.

In FIGS. 12, 13 and 14, a different modification of the manner of suspending each of a plurality of inertia weights is shown. In these figures, each inertia weight 88 may be suspended from a generally horizontal slightly inclined arm 89 having a horizontal end flange 90 seated against the bottom surface of the inner peripheral portion 61 and secured thereto by a pair of spaced bolts 91. A bearing strap 92 is provided for the bolts 91 on top of portion 61. Inertia weights 88 are diagonally arranged on opposite sides of the screen means and are not in direct opposite relation in order to produce a maximum twisting action transversely of the screen means. In this embodiment, it will be noted that the path of movement of each inertia weight 88 is in a planar zone parallel to the screen fabric and the border member 60 and that secondary vibratory impulses produced in the screen fabric by the inertia weight 88 will act in this planar zone. Such secondary vibration imparts a twisting motion of the screen fabric 58 virtually in the plane of the screen fabric as shown in FIG. 14. Such twisting motion imparted to screen fabric 59 will tend to prevent clogging and blinding thereof because mesh openings of the fabric are twisted and distorted out of their normal shape, and particles of material held in such openings will be loosened thereby. It should be noted that such twisting motion of fabric 59 is permitted without undue strain on the fabric by reason of the resiliency of border member 60.

In FIG. 15 still a different embodiment of the means for imparting a secondary impulse to the screen means is provided. In FIG. 15 an inertia weight 94 is carried at the end of an arm 95 which is pivotally connected as at 97 to a depending bracket member 96 carried by a pair of bearing flanges 98 and bolts 99 secured to the resilient border portion or the screen fabric in the manner described hereinabove. Integral with the upper end of arm 95 may be a pair of oppositely directed arms 100, each arm 100 carrying at its end an object 101 disposed in spaced proximity below screen fabric 59. Object 101 may be made of any suitable material, shape, and weight. A spherical object is shown and preferably it should be made of a light weight material such as aluminum, other light metals, or plastic compositions. Object 101 may be hollow or solid.

Upon vibration of the screen means 58 in a reciprocatory longitudinal direction, each inertia weight 94 causes a slight pivotal movement about pivot axis 97 so that objects 101 at the ends of horizontal arms 100 strike the bottom surface of screen fabric 59 to impart a slight jarring force thereto. Such jarring force tends to eliminate clogging and to cause material on the screen to be agitated in an upward direction which will facilitate movement of material toward the tail end of the screen means 58. Such agitation of material being separated also serves to facilitate separation of light particles from heavier particles and to assist passage of particles through the openings of the mesh of the screen fabric.

In FIG. 17 a different embodiment of means for producing a secondary impulse to a screen means is provided. In FIG. 17 independent suspension of a plurality of inertia weights is eliminated and instead a plurality of depending arms 105 in longitudinal spaced relation are provided along each longitudinal side of resilient border 60. The top ends of arms 105 may be connected by a plurality of bolts 106 and bearing straps 107 to the resilient inner peripheral portion 61 in a manner similar to that of the prior embodiments. The bottom ends of arms 105 may be pivotally interconnected to a longitudinally extending bar 108 disposed parallel to screen means 58. Adjacent the head end of screen means 58, bar 108 may be pivotally connected at 109 to a bracket on an inertia weight 110 of selected size. Inertia weight 110 may be slidably supported adjacent its top intermediate ends of a bolt 111 supported and extending from the peripheral wall of bottom box section 32. Biasing springs 112 may be held under compression between side faces of the inertia weight 110 and bearing surfaces in the form of washer 113 positioned against the peripheral wall and washer 114 carried at the end of bolt 111.

Primary longitudinal impulses imparted to screen means 58 will produce a reaction in inertia weight 110 which will provide for slight longitudinal movement thereof against biasing springs 112. Such movement will be imparted to the longitudinally extending bar 108 which will cause the arms 105 to rock about their connections to the resilient border member and thus cause an undulating travelling motion in screen fabric 59 somewhat similar to that produced by the depending inertia weights 80 in FIGS. 9 and 10.

In FIG. 18 still a different embodiment of a secondary impulse imparting means is shown wherein the construction is somewhat similar to that shown in FIG. 17, but instead a bar 108′ is extended through a port 115 in the peripheral wall of the bottom box section 32 for pivotal connection at 116 at its projecting end to a link 117 which may be pivotally connected at 118 at its opposite end to a vertically disposed arm 119 which may be connected at its other end (not shown) to an inertia means outside the box section or to a fixed support means. It will thus be apparent that as primary longitudinal impulses are imparted to the box assembly, the bar 108′ will produce a secondary vibration to the screen fabric 59.

In the embodiment of the invention shown in FIGS. 19–23 inclusive, the secondary impulse imparting means is of somewhat different construction. In this embodiment of the invention, a screen means 58 may be secured in stretched relation to bottom box section 32 of a shaking box assembly in the manner described above. Screen means 58 likewise includes a screen fabric 59 and a resilient peripheral border member 60 constructed as above described. Supported from the peripheral side walls of the bottom box section 32 may be a plurality of parallel transversely extending longitudinally spaced shafts 125, each end of each shaft 125 being mounted in journals at 126 carried by the side walls of the box section 32. Adjacent each side wall of the box section 32, each shaft 125 may have connected thereto a depending arm 127 by means of suitable adjustable clamp means 128. The bottom ends of arms 127 along each side may be pivotally connected at 129 to a longitudinally extending inertia bar 130. Each inertia bar 130 may be of selected weight and length and in this example, extends for a major portion of the length of the screen means 58.

Each transverse shaft 125 may be provided with a plurality of transversely spaced screen tapping or striking means in lateral alignment, each screen striking means including a longitudinally extending rod 132 passed through a bore in shaft 125 and secured to shaft 125 at approximately its midsection. At opposite ends of each rod 132 may be provided an object or element 133 of selected weight and form for striking or tapping the bottom surface of the screen fabric 59. Each element 133 may be of suitable shape and size, in this example, ball shaped. Elements 133 may be made of suitable light weight metal alloys such as aluminum, magnesium or the like, or of plastic compositions. The work to be performed by elements 133 in terms of inch-pounds should be substantially less than that of the inertia bars 130.

In normal operation since each shaft 125 is rotatably mounted in journal means 126 at the walls of the box section 32, inertia bars 130 will cause shafts 125 to move to a position with respect to screen fabric in accordance with gravitational forces. Since rods 132 are fixed to shafts 125, each shaft 125 may be fixed relative to the inertia bars 130 so that when the screen box 32 is in inclined position as shown in FIG. 21, the rods 132 may lie parallel to the screen fabric 59. In normal horizontal position, rods 132 would be angularly inclined to the screen fabric as shown in FIG. 20.

In FIG. 21, the elements 133 are spaced approximately an equal distance from the bottom surface of the screen fabric 59. When a primary longitudinal impulse is imparted to the screen box 32, the inertia bars 130 may remain relatively stationary, the shafts 125 will turn relative thereto in a small arc (FIG. 22) and the elements 133 on each rod 132 will alternately be moved into striking tapping contact with the bottom surface of the screen fabric 59 to impart a jarring or tapping force thereto.

Alternate tapping of the screen fabric 59 by the plurality of transverse rows of elements 133 will impart an undulating wave to material being separated flowing along the screen means 58. It should be noted that the tapping impact may produce some momentary increase in tension of the screen fabric at localized areas thereof above and adjacent to the rows of elements 133. Such increase in tension in the screen fabric may be readily absorbed by the resilient border member 60 so that, in the time intervals between tapping of the screen fabric, the screen fabric is rapidly returned to a condition of virtually uniform tension. It should be noted that the resilient border member 60 serves to reduce wear and fatigue on the screen fabric because of its action in resiliently yielding to such impact-created tension forces.

It should be further noted that the elements 133 in each striking means may be of identical weight and size and that if desired, the elements of the different striking means may be of different weight and size in order to produce a varied undulating wave motion at different sections along the length of the screen means 58.

It will be understood that the shaking box assembly of this invention may include secondary vibratory impulse-producing means in the form of inertia means on each of the screen means 58 provided therein or on any one of the screen means 58 if so desired. Thus, it may be desirable to employ secondary impulse-producing means on certain of the screens for material particles of certain size and such impulse-producing means may not be required on screens separating particles of different size. The inertia elements may be relatively heavy or may be relatively light depending entirely upon the character of the material being separated. In each instance, however, the inch-pounds of work performed by the inertia elements will be of substantially greater magnitude than the inch-pounds of work produced by the striking or tapping elements. The inertia bars described hereinabove may be of relatively rigid material or may be of a material having somewhat resilient characteristics so as to facilitate the transmittal of the forces reacting to the primary vibratory impulses. While inertia elements such as 80 have been shown arranged on opposite sides of the screen means in lateral alignment and in uniform spaced relation, it will be understood that such arrangement may be varied if desired so as to produce a preselected undulating and agitating motion in the material being separated on the screen means.

It is important to note the inclusion of the resilient border member 60 in the construction of the screen means 58 since the resiliency of the border member serves to maintain the tension of the screen fabric virtually uniform when the screen fabric is not subjected to tapping impact forces. Moreover, the resiliency of the border member provides elasticity in the screen means which reduces wear on the screen fabric. The resiliency of the border member also enhances the production of undulating and agitating motion imparted from the screen fabric to the material being separated.

In FIG. 24 a modification of the inertia bar 130 shown in FIGS. 19–23 is shown. In FIG. 24 a plurality of individual independent inertia weights 140 are each connected to one of the depending arms 127 so that each shaft 125 with its elements 133 may respond independently to primary impulses imparted to the shaking box assembly. Thus, the tapping of the screen fabric by different rows of elements may be in virtual unison or may be out of unison, depending upon the magnitude of primary impulses imparted at each shaft 125, the frictional characteristics of the shaft mountings, and difference in the mass of the separate inertia weights 140.

It should be noted that in each example above described the selection and placement of the inertia means is such that the center of gravity thereof lies substantially along the longitudinal center line of the shaking box assembly. Thus in the modifications of FIGS. 18 and 24 the inertia means may be at the longitudinal center line of the box assembly and suspended from the transverse shaft means.

It will be understood that various modifications and changes may be made in the shaking box assembly and secondary vibratory impulse means described above and that any such modification or change coming within the scope of the appended claims are embraced thereby.

I claim:

1. In an apparatus for separating material adapted to be agitated to impart thereto primary vibratory impulses, the combination of: a shaking box assembly comprising a rigid frame means, at least two box frame sections supported in stacked relation on said frame means, a screen means held in stretched relation between said two box frame sections and provided with a resilient peripheral border member; a cover member for said box sections provided with an inlet, and clamping means for securing said rigid frame means, box sections, screen means and cover member in assembled relation and for compressing and holding said resilient border member; inertia weight means disposed within one box frame section in spaced relation to said screen means; and means supporting said inertia weight means for reacting to said primary vibratory impulses whereby a secondary vibratory impulse is imparted to said screen means.

2. An apparatus as stated in claim 1 wherein said means supporting said inertia weight means includes a plurality of arms disposed below said screen means and each arm connected to said inertia weight means at one of its ends, and means connected with the other end of each arm for transmitting a secondary impulse to said screen means.

3. An apparatus as stated in claim 1 wherein said inertia weight means includes a plurality of inertia weights spaced in the direction of motion of the primary vibratory impulse.

4. An apparatus as stated in claim 2 wherein said means connected with the other end of said arms includes spaced elements disposed below said screen means and adapted to alternately strike said screen means to impart said secondary impulse thereto.

5. An apparatus as stated in claim 2 wherein said means connected to said other end of said arms includes a transversely extending shaft, and a plurality of pairs of elements carried by said shaft in transverse spaced relation, the elements of each pair being adapted to alternately strike said screen means.

6. In an apparatus for separating material adapted to be agitated to impart thereto primary vibratory impulses, the combination of: a shaking box assembly including at least two box frame sections and a screen means stretched between said box sections; a resilient border member on said screen means; and means connected to said resilient border member for imparting a secondary vibratory impulse to said screen means, said secondary vibratory impulse means including a plurality of arms, each connected at one end to said resilient border member, a longitudinally extending bar interconnecting the other ends of said arms, and means connected to one end of said bar for reacting to primary vibratory impulses imparted to said screen means.

7. In a separator apparatus adapted to be agitated to impart primary vibratory impulses thereto for separation of material, the combinataion of: a screen means for said apparatus including a peripheral border of resilient material having an inner peripheral portion and an outer peripheral portion; means securing said outer peripheral portion with said screen means and said resilient border under tension; and means including an inertia member positioned below said resilient inner portion to impart a secondary vibratory impulse to said screen means.

8. A screen means for a separator apparatus including a screen fabric for supporting material to be separated; a resilient peripheral border member for said screen fabric; a plurality of peripherally spaced angle clips bonded to outer peripheral portions of said peripheral border member; and an inner peripheral portion of said border member provided with material deflecting means for directing material toward the screen fabric.

9. A screen means as stated in claim 8 wherein said deflecting means are integral with the resilient inner peripheral border portion and are disposed at an angle to the longitudinal axis of the screen fabric.

10. In a separator apparatus adapted to be agitated to impart thereto primary vibratory impulses, the combination of: screen means including a screen fabric and a resilient peripheral border member around said fabric; and means at said border member responsive to said primary vibratory impulses to impart a secondary vibratory impulse to said screen fabric, said responsive means at said border member including a plurality of spaced elements at opposite edge portions of the screen means and supported at one side of the plane of said screen fabric.

11. In a separator apparatus adapted to be agitated to impart thereto primary vibratory impulses, the combination of: screen means including a screen fabric and a resilient peripheral border member around said fabric; and means at said border member responsive to said primary vibratory impulses to impart a secondary vibratory impulse to said screen fabric; said means to impart a secondary impulse to said screen fabric including a plurality of spaced elements at opposed sides of said peripheral border member and in spaced relation to said screen fabric, and an arm interconnecting each element and said resilient border member.

12. In a shaking box assembly for a separator apparatus, the combination of: a rigid frame means; at least two box sections supported in stacked relation on said frame means; screen means including a screen fabric held in uniformly stretched relation by one of the box sections and provided with a resilient peripheral border member serving as a gasket between said box sections, said border member including an outer resilient peripheral portion positioned between said box sections, said outer peripheral portion including a plurality of peripherally spaced retaining clip means imbedded therein and engageable with one of said box sections; a cover for said box sections; and means to secure and position said box sections and said cover on the rigid frame in assembled relation therewith and to compress and retain said outer portion of the resilient border member.

13. In an apparatus for separating material, the combination of: a shaking box assembly adapted to be reciprocally vibrated in a longitudinal direction and including a screen means; inertia weight means spaced below the screen means; means supporting the inertia weight means including transverse shaft means carried by the box assembly; and a plurality of transversely arranged elements carried by said shaft means in spaced relation thereto and responsive to said reciprocal vibrations to tap said screen means; said inertia means including an inertia bar at one side of said box assembly interconnected with each shaft means.

14. In a shaking box assembly for a separator apparatus, the combination of: a rigid frame means; at least two box sections arranged in stacked relation on said frame means, each box section having a peripheral wall defining an opening; screen means including a screen fabric held in uniformly stretched relation by one of the box sections over its opening and including a resilient peripheral border member connected to the fabric and having an inner peripheral portion under tension extending inwardly of the peripheral wall and having an outer peripheral portion serving as a gasket between said box sections; and means to secure and position said box sections on the rigid frame in assembled relation therewith and to compress and retain the outer portion of said resilient border member.

15. A shaking box assembly as stated in claim 14 wherein said rigid frame means includes positioning means cooperable with the adjacent box section for precisely locating the adjacent box section.

16. A shaking box assembly as stated in claim 14 wherein each of said box sections includes a discharge duct provided with a bottom wall; and an extension lip on said peripheral border member overlying said bottom wall of said discharge duct.

17. In a separator apparatus adapted to be agitated to impart thereto primary vibratory impulses, the combination of: screen means including a screen fabric; a resilient peripheral border member around said fabric; means retaining said border member in a preselected peripheral position for holding said screen fabric and said border member under tension; and means at said border member responsive to said vibratory impulses to impart a secondary vibratory impulse to said screen fabric while said screen fabric and border member are held under tension.

18. In a separator apparatus adapted to be agitated to impart thereto primary vibratory impulses, the combination of: screen means including a screen fabric; a resilient peripheral border member around said fabric; means retaining said border member in a preselected peripheral position for holding said screen fabric under tension; means at said border member responsive to said vibratory impulses to impart a secondary vibratory impulse to said screen fabric; said means for imparting secondary vibratory impulses to the screen fabric including inertia weights supported in spaced relation to the screen fabric, an arm means connecting said each inertia weight with said resilient border member, a pivotal connection between said arm and said resilient border member, and means carried at said pivotal connection and extending therefrom in the direction of the longitudinal axis of the screen means for striking said screen fabric.

19. In combination with a separator apparatus having a rigid frame with peripheral margins; the provision of: a screen means including a screen fabric for supporting material to be separated; a resilient peripheral border member for said screen fabric; a plurality of peripherally spaced securement means bonded to outer peripheral portions of said border member and engaging said peripheral margins in screen tensioning and positioning relation; an inner peripheral portion on said border member; and material deflecting means on the inner peripheral portion for directing material toward the screen fabric.

20. In a shaking box assembly for a separator apparatus, the combination of: a rigid frame means; at least two box sections supported in stacked relation on said frame means; screen means including a screen fabric held in uniformly stretched relation by one of the box sections and provided with a resilient peripheral border member serving as a gasket between said box sections, said border member including an inner peripheral portion extending inwardly of the box frame sections, said screen fabric being embedded in only the innermost margin of the inner portion whereby the remainder of the inner portion is capable of resilient tensioning; and means to secure and position said box sections on the rigid frame in assembled relation therewith and to compress and retain said resilient border member.

References Cited in the file of this patent

UNITED STATES PATENTS

| | | |
|---|---|---|
| 615,524 | Brandstaedter | Dec. 6, 1898 |
| 2,015,087 | Rafton | Sept. 24, 1935 |
| 2,053,895 | Burneister | Sept. 8, 1936 |
| 2,511,239 | Behnke et al. | June 13, 1950 |
| 2,568,800 | Golla | Sept. 25, 1951 |
| 2,722,978 | Frisk | Nov. 8, 1955 |
| 2,865,506 | Velke | Dec. 23, 1958 |
| 2,874,841 | Peterson | Feb. 24, 1959 |
| 2,939,581 | Ashton | June 7, 1960 |

FOREIGN PATENTS

| | | |
|---|---|---|
| 46,255 | Netherlands | June 16, 1939 |
| 187,567 | Germany | Nov. 1, 1906 |
| 500,268 | Italy | Nov. 17, 1954 |
| 784,916 | France | July 29, 1935 |